United States Patent
Xu et al.

(10) Patent No.: US 12,056,531 B2
(45) Date of Patent: Aug. 6, 2024

(54) METHOD AND APPARATUS FOR ACCELERATING CONVOLUTIONAL NEURAL NETWORK

(71) Applicant: CANAAN BRIGHT SIGHT CO., LTD., Beijing (CN)

(72) Inventors: Bing Xu, Beijing (CN); Nangeng Zhang, Beijing (CN)

(73) Assignee: CANAAN BRIGHT SIGHT CO., LTD, Beijing (CN)

( * ) Notice: Subject to any disclaimer, the term of this patent is extended or adjusted under 35 U.S.C. 154(b) by 25 days.

(21) Appl. No.: 18/015,308

(22) PCT Filed: Nov. 3, 2020

(86) PCT No.: PCT/CN2020/126196
§ 371 (c)(1),
(2) Date: Jan. 9, 2023

(87) PCT Pub. No.: WO2022/007266
PCT Pub. Date: Jan. 13, 2022

(65) Prior Publication Data
US 2023/0289230 A1    Sep. 14, 2023

(30) Foreign Application Priority Data
Jul. 8, 2020  (CN) .......................... 202010652622.8

(51) Int. Cl.
*G06F 9/50* (2006.01)
*G06F 15/80* (2006.01)
(52) U.S. Cl.
CPC ............ *G06F 9/5027* (2013.01); *G06F 15/80* (2013.01)
(58) Field of Classification Search
CPC ................................ G06F 9/5027; G06F 15/80
See application file for complete search history.

(56) References Cited

U.S. PATENT DOCUMENTS

2019/0138922 A1* 5/2019 Liu .................... G06N 3/048
2019/0294413 A1* 9/2019 Vantrease ............. G06F 7/5095
(Continued)

FOREIGN PATENT DOCUMENTS

CN    108537330    9/2018
CN    108629406    10/2018
(Continued)

OTHER PUBLICATIONS

International Search Report for PCT/CN2020/126195, dated Apr. 9, 2021, 4 pages.
(Continued)

*Primary Examiner* — Zachary K Huson
(74) *Attorney, Agent, or Firm* — Nixon & Vanderhye P.C.

(57) ABSTRACT

A method and apparatus for accelerating a convolutional neural network. The method comprises: splitting, according to rows, a weight matrix of a convolutional layer into a plurality of weight segments, and respectively caching the plurality of weight segments to a plurality of calculation units in a calculation unit array (step 301); reading a plurality of input data streams respectively corresponding to the plurality of weight segments, and inputting the plurality of input data streams in parallel into the plurality of calculation units (step 302), wherein the input data streams are formed by means of splicing a plurality of rows of data in an input feature map of the convolutional layer; and within each calculation unit, performing a sliding window operation and a multiply-accumulate computation on the input data streams on the basis of the cached weight segments, so as to obtain an output feature map of the convolutional layer (step 303). By means of the method, data that enters each row of calculation units is continuously read according to the whole row of data, and does not need to be read in a cross-row or cross-column manner, such that a special (Continued)

design is not needed for the arrangement of a memory, convolutions of different sizes are supported, and the function of Im2col does not need to be realized, thereby reducing the complexity.

10 Claims, 4 Drawing Sheets

(56) References Cited

U.S. PATENT DOCUMENTS

| | | | | |
|---|---|---|---|---|
| 2020/0097826 | A1* | 3/2020 | Du | G06N 3/063 |
| 2021/0350214 | A1* | 11/2021 | Li | H03M 7/40 |

FOREIGN PATENT DOCUMENTS

| | | |
|---|---|---|
| CN | 109272113 | 1/2019 |
| CN | 110705687 | 1/2020 |

OTHER PUBLICATIONS

Written Opinion of the ISA for PCT/CN2020/126195, dated Apr. 9, 2021, 4 pages.

* cited by examiner

METHOD AND APPARATUS FOR ACCELERATING CONVOLUTIONAL NEURAL NETWORK

This application is the U.S. national phase of International Application No. PCT/CN2020/126196 filed Nov. 3, 2020 which designated the U.S. and claims priority to CN 202010652622.8 filed Jul. 8, 2020, the entire contents of each of which are hereby incorporated by reference.

TECHNICAL FIELD

The present disclosure relates to the field of deep learning, and in particular to a method and an apparatus for accelerating a convolutional neural network.

BACKGROUND

This section is intended to provide background or context to embodiments of the present disclosure as set forth in claims. What is described herein is not admitted as prior art merely by virtue of its inclusion in this section.

Convolutional neural networks (CNNs), as a type of deep feed-forward artificial neural network, have been applied to many fields, such as image recognition. The processing by the convolutional neural network may involve relatively complex computations, which mainly include convolution computations, batch normalization computations, activation computations, and the like. Most of current neural network chips (NPUs) are mainly intended to solve computation problems of CNN to accelerate the computations of CNN.

In the related art, a common approach is to optimize the convolution computation using an Im2col function. As shown in FIG. 1, during a training or learning process of the CNN, an image is generally not processed in its entirety by the CNN at once, but is firstly divided into a number of small patches, each of which needs to be processed with the Im2col function for rearrangement, such that the three-dimensional patches are unfolded into one-dimensional vectors, thus the convolution operation is converted into two-dimensional matrix multiplication defined as $C=D \times W$, where D refers to an input image matrix, and W refers to a weight matrix.

According to the aforesaid solution, simultaneous access to multiple rows and columns of data is required for a single convolution computation. For example, in the case of a 3×3 convolution, nine numbers required for a single convolution are distributed in three rows and three columns. It should be understood that the data-reading bandwidth can be reached only when the data reading is performed on continuous data, and thus for the need of simultaneous access to the above-mentioned nine numbers, a special design for the layout of the internal memory is required, for example, the internal memory may be segmented to improve parallelism of accessing the internal memory. However, an NPU is generally desired to support convolutions of various sizes. Thus, in order to achieve versatility for various convolutional kernels, the memory needs to be segmented into many small segments to be compatible with various settings of the NPU, resulting in increasing the area of the internal memory on one hand and increasing the complexity of data access logics on the other hand. Therefore, designing a convolutional neural network acceleration method with high versatility and low complexity is a severe technical problem to be solved at present.

SUMMARY

In view of the aforesaid problem that the convolution computation of the related art has a poor versatility and high complexity, embodiments of the present disclosure provide a method and an apparatus for accelerating a convolutional neural network. According to this method and apparatus, the aforesaid problem can be solved.

Embodiments of the present disclosure provide following solutions.

In a first aspect, provided is a method of accelerating a convolutional neural network. The method includes: splitting, by rows, a weight matrix of a convolutional layer into a plurality of weight segments, and caching the plurality of weight segments respectively in a plurality of computation units of a computation unit array; reading a plurality of input data streams corresponding respectively to the plurality of weight segments, and inputting the plurality of input data streams in parallel to a plurality of rows of the computation units, where each of the input data streams is formed by concatenating multiple rows of data from an input feature map of the convolutional layer; and performing, by each computation unit, sliding window operations and multiply-accumulating computations on the inputted input data stream based on the cached weight segment to acquire an output feature map of the convolutional layer.

In a possible embodiment, reading the plurality of input data streams corresponding respectively to the plurality of weight segments further includes: determining, for each weight segment, corresponding multiple rows of data in the input feature map based on a convolution stride of the convolutional layer, and reading and concatenating the corresponding multiple rows of data in sequence to form an input data stream corresponding to said each weight segment.

In a possible embodiment, performing, by said each computation unit, the sliding window operations and the multiply-accumulating computations on the inputted input data stream based on the cached weight segment further includes: performing, by said each computation unit, the sliding window operations on the input data stream inputted to said each computation unit by taking the corresponding weight segment as a sliding window and taking a convolution stride of the convolutional layer as a sliding step, and performing the multiply-accumulating computations based on the corresponding weight segment and data within the sliding window.

In a possible embodiment, in case a cache space of each of the computation units is less than an entire row length of the weight matrix, the method further includes: splitting each weight segment of the weight segments into a plurality of sections; caching the plurality of sections of said each weight segment respectively at different time periods in a corresponding computation unit; performing, by the computation unit, the sliding window operations and the multiply-accumulating computations on the inputted input data stream based on the section presently cached at each of the different time periods to acquire different output feature submaps at the different time periods; and superimposing the acquired output feature submaps.

In a possible embodiment, the method further includes: determining an index offset value for the sliding window operations based on the section cached presently in each of the computation units, where the index offset value is configured to indicate an initial position of the sliding window.

In a second aspect, provided is an apparatus for accelerating a convolutional neural network. The apparatus includes: a logic control unit and a computation unit array, where the computation unit array includes a plurality of computation units each including a cache unit, a control unit, and a multiply-accumulating unit; where the logic control unit is configured to split, by rows, a weight matrix of a convolutional layer into a plurality of weight segments, cache the plurality of weight segments respectively into the plurality of computation units, read a plurality of input data streams corresponding respectively to the plurality of weight segments, and input the plurality of input data streams in parallel to a plurality of rows of the computation units, where each of the input data streams is formed by concatenating multiple rows of data from an input feature map of the convolutional layer; and within each computation unit, the cache unit is configured to have a corresponding weight segment cached therein, the control unit is configured to perform sliding window operations on the inputted input data stream based on the cached weight segment, and the multiply-accumulating unit is configured to perform multiply-accumulating computations.

In a possible embodiment, the logic control unit is configured to determine, for each weight segment, corresponding multiple rows of data in the input feature map based on a convolution stride of the convolutional layer, and read and concatenate the corresponding multiple rows of data in sequence to form an input data stream corresponding to said each weight segments.

In a possible embodiment, within said each computation unit, the control unit is configured to perform the sliding window operations on the corresponding input data stream inputted to said each computation unit by taking the corresponding cached weight segment as a sliding window and a convolution stride of the convolutional layer as a sliding step; and the multiply-accumulating unit is configured to perform the multiply-accumulating computations based on the corresponding cached weight segment and data within the sliding window.

In a possible embodiment, in case a cache space of each of the computation units is less than an entire row length of the weight matrix, the logic control unit is configured to: split each weight segment of the weight segments into a plurality of sections; cache the plurality of sections of said each weight segment respectively at different time periods in a corresponding computation unit; performing, by the computation unit, the sliding window operations and the multiply-accumulating computations on the inputted input data stream based on the section presently cached at each of the different time periods to acquire different output feature submaps at the different time periods; and superimpose the acquired output feature submaps.

In a possible embodiment, the logic control unit is configured to determine an index offset value for the sliding window operations based on the section presently cached in the corresponding computation unit, where the index offset value is configured to indicate an initial position of the sliding window.

At least one of the aforesaid technical solutions adopted in the embodiments of the present disclosure can achieve following beneficial effects in that, without using the Im2col function, weight segments are obtained by splitting the weight matrix of the convolutional layer and cached in computation units respectively, and for each computation unit, an input data stream is formed by concatenating corresponding multiple rows of data from the input feature map, and then within each computation unit, sliding window operations and multiply-accumulating computations are performed on the inputted input data stream based on the corresponding cached weight segment, thereby achieving acceleration of the convolution computation. According to this solution, the data to be entered into each computation unit is read sequentially row by row, without reading the data across rows or columns. Therefore, convolution computations of different sizes can be supported without a special design for the layout of the internal memory, and there is no necessity to implement the function of Im2col separately, whereby the complexity can be reduced.

It should be noted that the aforesaid description only shows a summary of the technical solutions of the present disclosure to facilitate better understanding of technical means of the present disclosure for implementing the present disclosure in accordance with the content described in the specification. Specific embodiments of the present disclosure will be given below to make the above and other objects, features, and advantages of the present disclosure more apparent.

BRIEF DESCRIPTION OF THE DRAWINGS

By reading following details of the exemplary embodiments below, those of ordinary skills in the art may understand the advantages and benefits described herein and other advantages and benefits. The accompanying drawings are for the purpose of illustrating exemplary embodiments only and are not intended to be a limitation of the present disclosure. Further, a same reference sign is adopted to indicate a same component throughout the accompanying drawings. In the accompanying drawings.

In the accompanying drawings, the same or corresponding reference signs indicate same or corresponding portions.

DETAILED DESCRIPTION

Exemplary embodiments of the present disclosure will be described below in more detail with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In the present disclosure, it should be understood that terms such as "include" or "comprise" are intended to indicate the existence of the characteristics, digits, steps, actions, components, parts disclosed by the specification or any combination thereof, without excluding the existence of one or more other characteristics, digits, steps, actions, components, parts or any combination thereof.

Furthermore, it should be noted that in the case of no conflict the embodiments of the present disclosure and features of the embodiments may be combined with each other in any manner. The present disclosure will be described in detail below with reference to the accompanying drawings and embodiments.

Figure 1:
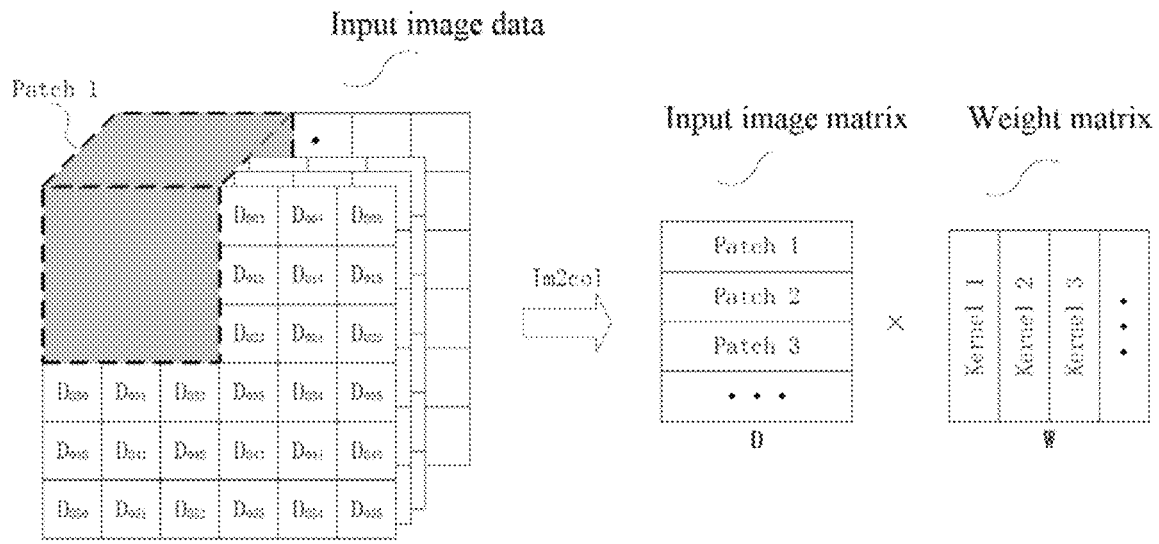
FIG. 1 is a schematic diagram of Im2col-based convolution computations in the related art.
Figure 2:
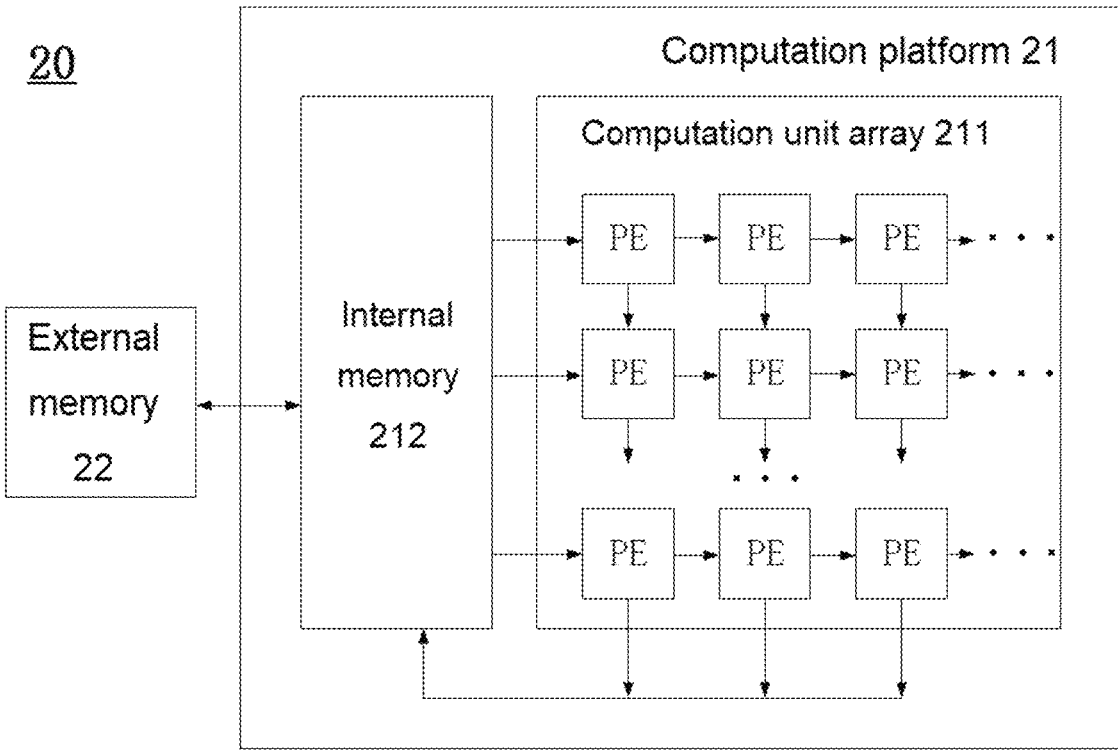
FIG. 2 is a schematic structural diagram of a CNN computation apparatus.

FIG. 2 is a schematic structural diagram of a CNN computation apparatus 20. The apparatus 20 includes a computation platform 21 and an external memory 22. The computation platform 21 at least includes a computation unit array 211 for performing convolution computations and an internal memory 212. The external memory 22 generally utilizes a low-cost storage medium, which typically is limited in bandwidth and has a high read/write power consumption. The internal memory generally may utilizes a storage medium with a faster access speed, such as SRAM, which has a larger bandwidth and lower read/write cost, but typically is costly and therefore generally has a limited capacity.

Figure 3:
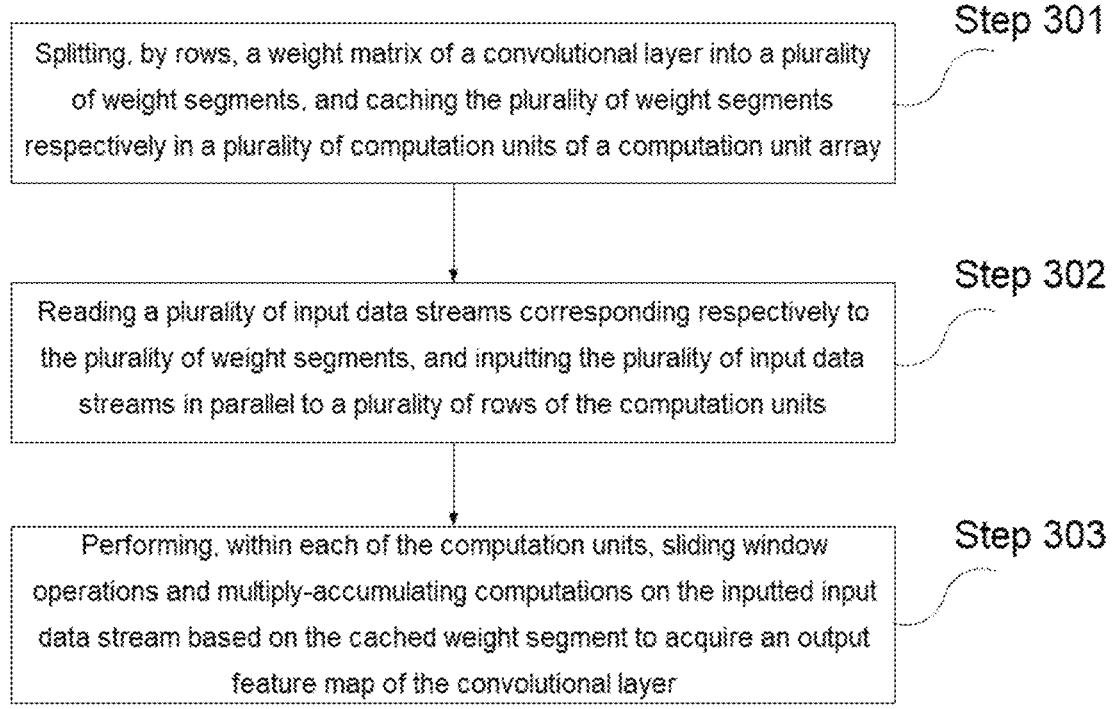
FIG. 3 is a schematic flowchart of a method of accelerating a convolutional neural network according to an embodiment of the present disclosure.

FIG. 3 is a schematic flowchart of a method 300 for accelerating a convolutional neural network according to an embodiment of the present disclosure. Aspects of the method 300 for accelerating a convolutional neural network as shown in FIG. 3 will be described in detail below in conjunction with the CNN computation apparatus as shown in FIG. 2.

As shown in FIG. 3, the method 300 may include following steps:

Step 301: splitting, by rows, a weight matrix of a convolutional layer into a plurality of weight segments, and caching the plurality of weight segments respectively in a plurality of computation units PE in a computation unit array;

Step 302: reading a plurality of input data streams corresponding respectively to the plurality of weight segments, and inputting the plurality of input data streams in parallel to a plurality of rows of the computation units PE; and Step 303: performing, by each of the computation units PE, sliding window operations and multiply-accumulating computations on the inputted input data stream based on the cached weight segment to acquire an output feature map of the convolutional layer.

Figure 4:
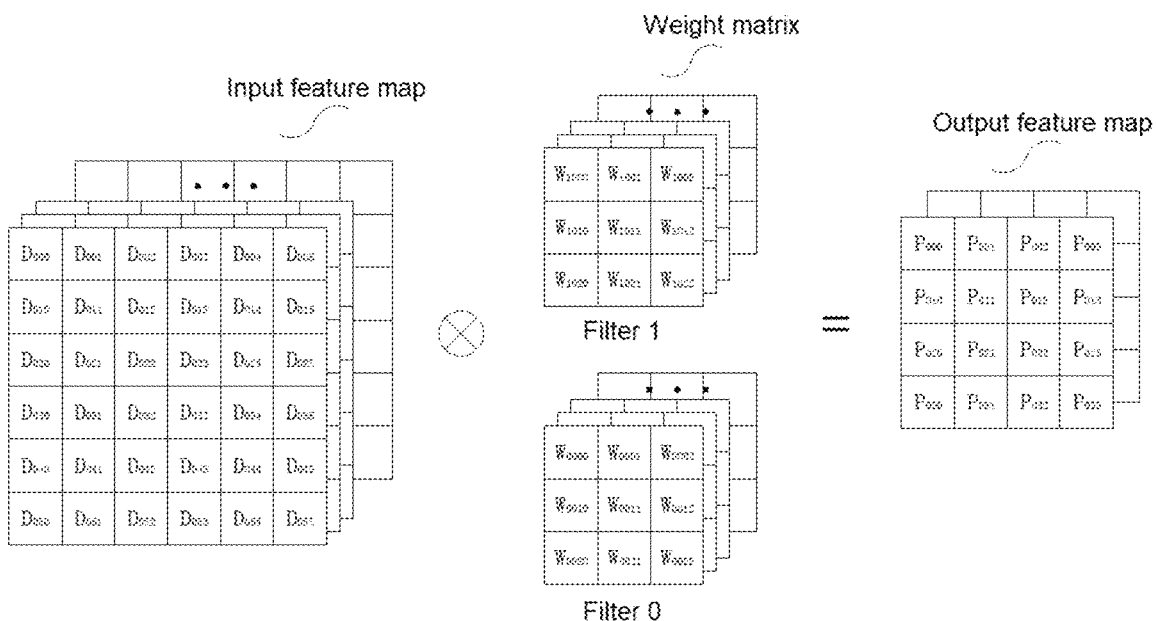
FIG. 4 is a schematic diagram of a three-dimensional CNN convolution.

FIG. 4 is a schematic diagram of a three-dimensional CNN convolution. For any convolutional layer of the convolutional neural network, it is assumed that the input feature map of the convolutional layer is a data matrix consisting of a number of data $D_{abc}$ with dimensions of 6 (columns)×6 (rows)×N (the number of input channels), where the subscript a of $D_{abc}$ denotes a series number of the input channel and takes values of 0, 1, . . . , (N–1); the subscript b of $D_{abc}$ denotes a row number and takes values of 0, 1, . . . , 5; and the subscript c of $D_{abc}$ denotes a column number and takes values of 0, 1, . . . , 5. The input feature map is generally stored in a row-wise and channel-wise manner sequentially and successively in the external memory 22, where N is a positive integer greater than 2. The weight matrix of the convolutional layer is a data consisting of a number of weights $W_{mnpq}$ with dimensions of 3 (columns)×3 (rows)×N (the number of input channels)×2 (the number of output channels) and is generally stored in the external memory 22, where the subscript n of $W_{mnpq}$ denotes a series number of the input channel and takes values of 0, 1, . . . , (N–1); the subscript p of $W_{mnpq}$ denotes a row number and takes values of 0, 1, 2; the subscript q of $W_{mnpq}$ denotes a column number and takes values of 0, 1, 2; and the subscript m of $W_{mnpq}$ denotes a series number of the output channel and takes values of 0, 1 corresponding to a filter 0 and a filter 1 in FIG. 4, respectively. The output feature map is a data matrix consisting of a number of data $P_{xyz}$ with dimensions of 4 (columns)×4 (rows)×N (the number of input channels), where the subscript x of $P_{xyz}$ denotes a series number of the output channel and takes values of 0, 1; the subscript y of $P_{xyz}$ denotes a row number and takes values of 0, 1, 2, 3; and the subscript z of $P_{xyz}$ denotes a column number and takes values of 0, 1, 2, 3. In this embodiment, the convolution computation to be implemented is an operation of mapping from the input feature map and the weight matrix to the output feature map.

Figure 5:
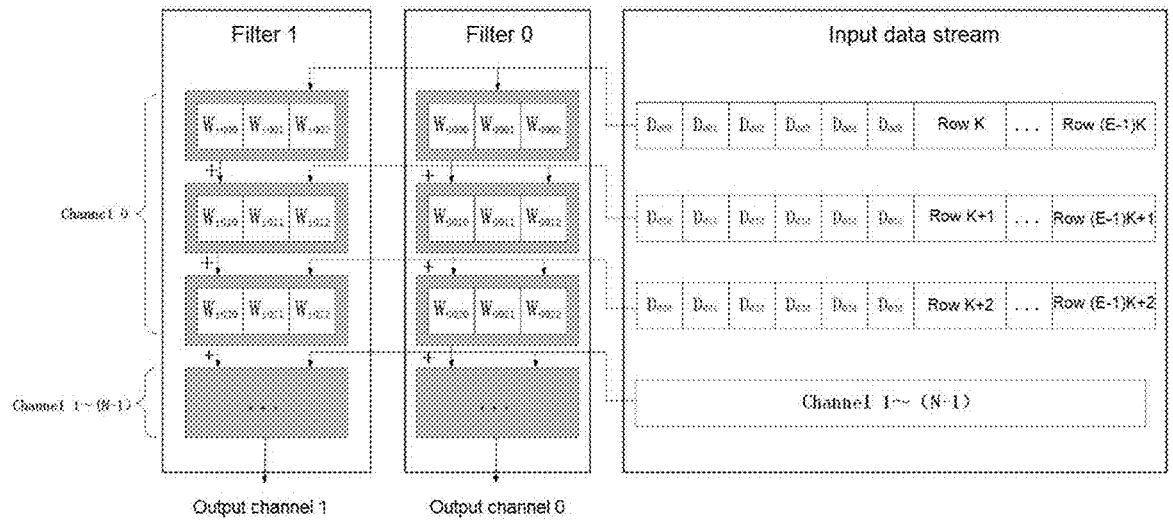
FIG. 5 is a schematic diagram of convolution by computation units with weight segments cached therein according to an embodiment of the present disclosure.

In embodiments of the present disclosure, taking the three-dimensional CNN convolution shown in FIG. 4 as an example, firstly a weight matrix of the convolutional layer is read from the external memory 22 into the internal memory 212, and then is split by rows into a plurality of weight segments, as shown in step 301. For example, the weight matrix shown in FIG. 4 may be split into 3×N×2 weight segments, and each of the weight segments corresponds to a row of weight values of the weight matrix and has dimensions of 3 (columns)×1 (rows)×1 (the number of input channels)×1 (the number of output channels). Further, FIG. 5 is a schematic diagram of convolution by computation units PE with weight segments cached therein according to an embodiment of the present disclosure. As shown in FIG. 5, the plurality of weight segments are respectively cached in a plurality of computation units PE in the computation unit array. For example, a weight segment ($W_{0000}$, $W_{0001}$, $W_{0002}$) may be cached in one computation unit PE, a weight segment ($W_{0010}$, $W_{0011}$, $W_{0012}$) may be cached in another computation unit PE, and so forth.

As shown in FIG. 5, a plurality of weight segments in the weight matrix that correspond to the same output channel are cached in the same column of computation units from the computation unit array. For example, two columns of computation units PE may be adopted to cache the weight segments in the filter 0 and the filter 1, respectively. Furthermore, different weight segments that correspond to the same input data stream may be arranged in the same row of computation units from the computation unit array.

Furthermore, as shown in step 302, a plurality of input data streams corresponding respectively to the plurality of weight segments are read and then inputted in parallel to a plurality of rows of the computation units PE.

In a plurality of convolution windows determined by convolution computations based on the weight matrix and the input feature map, each weight segment corresponds to different data $D_{abc}$. Taking the convolution stride k of 2 as an example, the convolution computation based on the weight segment ($W_{0000}$, $W_{0001}$, $W_{0002}$) involves the input data with the row number b of 0 and 2 merely. Therefore, for each weight segment, corresponding rows of data from the input feature map may be determined and concatenated to form an input data stream corresponding to said each weight segment. During the convolution computation, a plurality of input data streams corresponding to the plurality of weight segments are read and inputted to a plurality of rows of the computation units PE in parallel.

In some possible embodiments, the step 302 further includes: determining, for each weight segment, corresponding multiple rows of data in the input feature map based on a convolution stride of the convolutional layer, and reading and concatenating the corresponding multiple rows of data in sequence to form an input data stream corresponding to said each weight segment. For example, given the convolution stride k of the convolutional layer, the input data stream corresponding to the weight segment ($W_{0000}$, $W_{0001}$, $W_{0002}$) is formed by concatenating the data of rows 0, k, . . . , and (E−1)k in the corresponding input channel of the input feature map in FIG. 4, that is, the corresponding input data stream is ($D_{000}$, $D_{001}$, $D_{002}$, $D_{003}$, $D_{004}$, $D_{005}$, $D_{0,10}$, $D_{011}$, . . . ) if k=1; the input data stream corresponding to the weight segment ($W_{0010}$, $W_{0011}$, $W_{0012}$) is formed by concatenating the data of rows 1, k+1, (E−1)k+1 in the corresponding input channel of the input feature map in FIG. 4, the input data stream corresponding to the weight segment ($W_{0020}$, $W_{0021}$, $W_{0022}$) is formed by concatenating the data of rows 2, k+2, . . . , (E−1)k+1 in the corresponding input channel of the input feature map in FIG. 4; and so forth.

Furthermore, as shown in step 303, by each computation unit PE, sliding window operations and multiply-accumulating computations are performed on the inputted input data stream based on the cached weight segment to acquire an output feature map of the convolutional layer.

Figure 6:
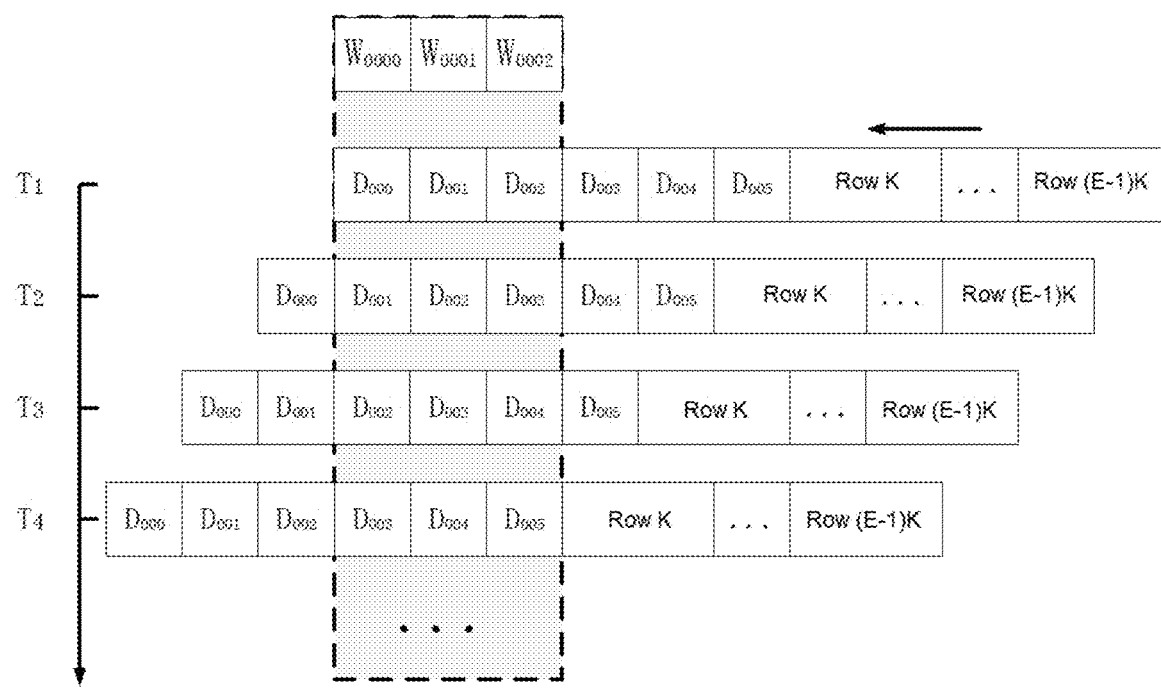
FIG. 6 is a schematic diagram of sliding window operations by a computation unit with a weight segment cached therein according to an embodiment of the present disclosure.

In some possible embodiment, the step 303 further includes: performing, by said each computation unit PE, the sliding window operations on the corresponding input data stream inputted to said each computation unit PE by taking the cached weight segment as a sliding window and taking a convolution stride of the convolutional layer as a sliding step, and performing the multiply-accumulating computations based on the corresponding weight segment and data within the sliding window. For example, FIG. 6 is a schematic diagram of sliding window operations by a computation unit PE with a weight segment cached therein. As shown in FIG. 6, for the weight segment ($W_{0000}$, $W_{0001}$, $W_{0002}$), the corresponding input data stream is the data having the input channel a of 0 and the row number b of 0, k, . . . , (E−1) k in the input feature map $D_{abc}$ of FIG. 4, that is, ($D_{000}$, $D_{001}$, $D_{002}$, $D_{003}$, $D_{004}$, $D_{005}$, $D_{010}$, $D_{011}$, . . . ). Based on this, in timing sequence $T_1$, the weight segment ($W_{0000}$, $W_{0001}$, $W_{0002}$) slides on the input data stream to ($D_{000}$, $D_{001}$, $D_{002}$), and the multiply-accumulating operation $W_{0000} \times D_{000} + W_{0001} \times D_{001} + W_{0002} \times D_{002}$ is performed based on the weight segment and input data in the window. At the same time, other computation units PE also perform the sliding simultaneously on their corresponding input data streams based on the cached weight segments and perform the multiply-accumulating operations based on the respective weight segments and the data in the window. For example, the weight segment ($W_{0010}$, $W_{0011}$, $W_{0012}$) slides to ($D_{010}$, $D_{011}$, $D_{012}$), the weight segment ($W_{0020}$, $W_{0021}$, $W_{0022}$) slides to ($D_{020}$, $D_{021}$, $D_{022}$), and so on for the weight segments in other input channels. Then, the multiply-accumulating result of each computation unit PE at the timing sequence $T_1$ may be acquired. Thus, an output value $P_{000}$ of an output channel may be acquired by summing up all the multiply-accumulating results of a column of computation units PE corresponding to the filter 0 at the timing sequence $T_1$; and an output value $P_{100}$ of another output channel may be acquired by summing up all the multiply-accumulating results of a column of computation units PE corresponding to the filter 1 at the timing sequence $T_1$. At the timing sequence $T_2$, the weight segment ($W_{0000}$, $W_{0001}$, $W_{0002}$) slides on the input data stream by k data, and thus may slide to ($D_{001}$, $D_{002}$, $D_{003}$) under the assumption of k=1; and then, the multiply-accumulating operation, i.e., $W_{0000} \times D_{001} + W_{0001} \times D_{002} + W_{0002} \times D_{003}$ . . . , is performed based on the weight segment and the input data in the window; and so forth. Eventually, each value in the output feature map in FIG. 4 may be acquired.

With the above-described method in this embodiment, the data in the input feature map may be read from the external memory row by row and inputted to each row of computation units PE in parallel in the form of data streams, which eliminates the need for frequent cross-row or cross-column reading of the input feature map stored continuously in a single storage direction in the external memory. Thus, convolution computations of different sizes can be supported without a special design for the layout of the internal memory. In addition, there is no need to additionally implement the function of the Im2col in the computation platform, which saves hardware resources and computation power.

In some possible embodiments, in case a cache space of each of the computation units PE is less than an entire row length of the weight matrix, the method further includes: splitting each weight segment into a plurality of sections; caching the plurality of sections of said each weight segment respectively at different time periods in a corresponding computation unit PE; performing, by each computation unit PE, the sliding window operations and the multiply-accumulating computations on the input data stream based on the section presently cached at each of the different time periods to acquire different output feature submaps at the different time periods; and superimposing the acquired output feature submaps.

For example, assuming that the size of the weight matrix of the convolutional layer is 10 (columns)×10 (rows)×N (the number of input channels)×2 (the number of output channels), the size of a single weight segment is 10 (columns)×1 (row)×1 (the number of input channels)×1 (the number of output channels). In case the cache space of the computation unit PE is limited and each computation unit PE may for example cache only 5 weight values, each weight segment is split into a plurality of sections in this embodiment. For example, given a weight segment ($W_{0000}$, $W_{0001}$, . . . , $W_{0009}$), it may be split into a first section ($W_{0000}$, $W_{0001}$, . . . , $W_{0004}$) and a second section ($W_{0005}$, $W_{0006}$, . . . , $W_{0009}$). Accordingly, the first sections of the plurality of weight segments may be read firstly from the external memory and cached in the corresponding computation units PE in the first time period. Then, the input data stream corresponding to each weight segment is read from the external memory and inputted to the corresponding computation unit PE, and each computation unit PE performs first sliding window operations and multiply-accumulating computations on the input data stream based on the cached first section to acquire a first output feature submap. After the computations involved in the first section are executed, the second sections of the plurality of weight segments are read from the external memory and cached in the corresponding computation units PE in a second time period to replace the original first sections. Then, the input data stream corresponding to each weight segment is read again from the external memory and inputted to the corresponding computation unit PE, and each computation unit PE performs second sliding window operations and multiply-accumulating computations on the input data stream based on the cached second section to acquire a second output feature submap. Furthermore, the first output feature submap and the second output feature submap are matrix-accumulated to output the output feature map of the convolutional layer.

In this embodiment, the solution is applicable to a convolution with a relatively large-sized weight data by splitting the weight segment into sections, without expanding the on-chip cache space, and thereby further enhances the versatility of convolution computations for weight data of various sizes.

In some possible embodiments, the method further includes: determining an index offset value for the sliding window operations based on the section presently cached in each of the computation units PE. The index offset value is configured to indicate an initial position of the sliding window.

As a result of splitting the weight segments, a different starting position on the input data stream for the sliding window operations is applied to each section. For example, the starting position for sliding of the first section ($W_{000}$, $W_{0001}, \ldots, W_{0004}$) on each row of the input data stream is not shifted; whereas the starting position for sliding of the second section ($W_{0005}, W_{0006}, \ldots, W_{0009}$) on each row of the input data stream is shifted by 5, i.e. the number of weights prior to the second section in each weight segment. For the case of uniform sections, the index offset value is s×L, where s indicates the serial number of the section and takes values of 0, 1, 2, . . . ; and L indicates the size of the section.

Based on the same or similar technical concepts, embodiments of the present disclosure further provide an apparatus for accelerating a convolutional neural network. The apparatus includes a logic control unit and a computation unit array. Each computation unit PE includes a cache unit, a control unit and a multiply-accumulating (MAC) unit.

Figure 7:
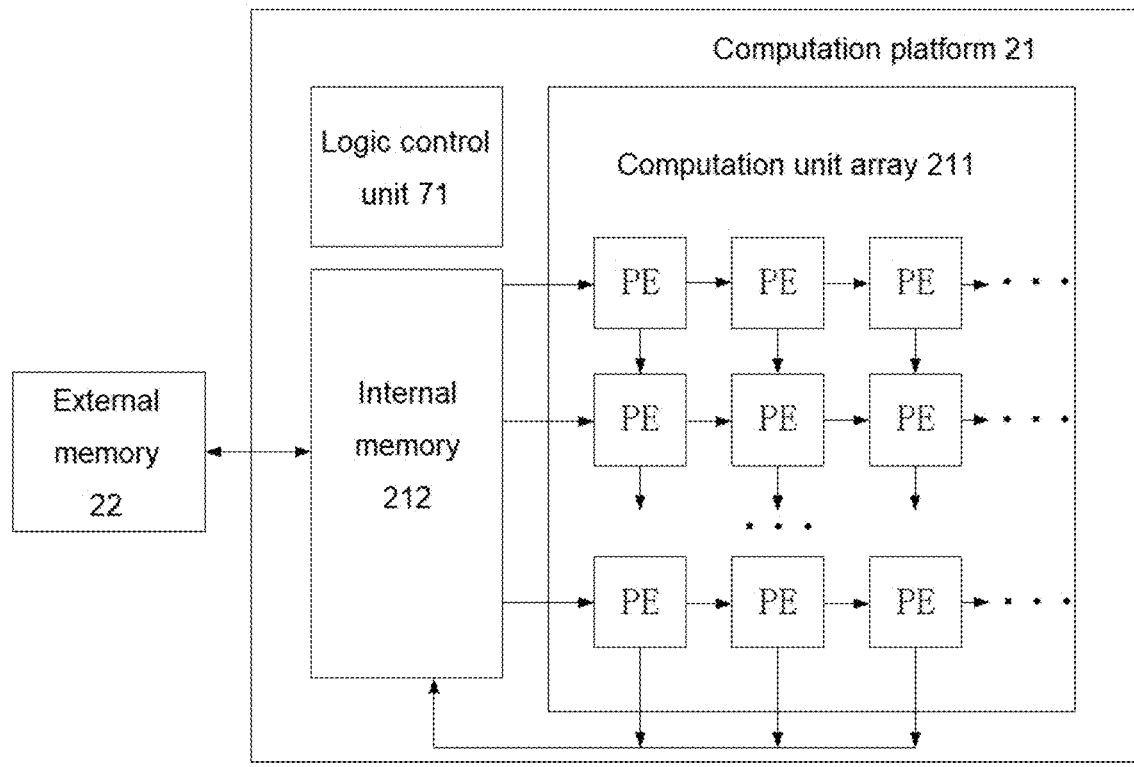
FIG. 7 is a schematic structural diagram of an apparatus for accelerating a convolutional neural network according to an embodiment of the present disclosure.
Figure 8:
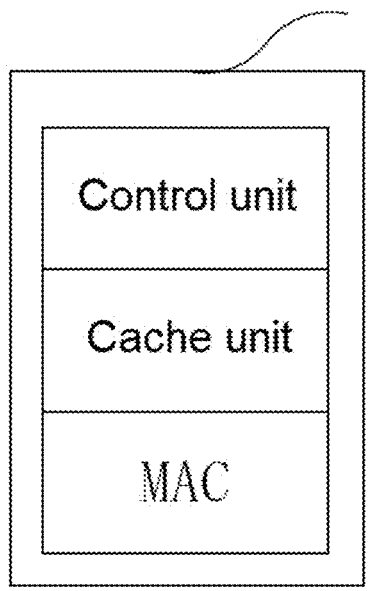
FIG. 8 is a schematic structural diagram of a computation unit of the apparatus for accelerating a convolutional neural network according to an embodiment of the present disclosure.

In this embodiment, as shown in FIGS. 7 and 8, the logic control unit 71 and the computation unit array 211 may be provided on the computation platform 21 of the convolutional neural network computation apparatus 20 shown in FIG. 2. The logic control unit 71 is configured to split, by rows, a weight matrix of a convolutional layer into a plurality of weight segments, cache the plurality of weight segments respectively in a plurality of computation units PE in the computation unit array, read a plurality of input data streams corresponding respectively to the plurality of weight segments, and input the plurality of input data streams in parallel to a plurality of rows of the computation units PE. Each input data stream is formed by concatenating multiple rows of data from an input feature map of the convolutional layer. Within each computation unit PE, the cache unit is configured to cache a corresponding weight segment therein, the control unit is configured to perform sliding window operations on the corresponding input data stream based on the corresponding cached weight segment, and the multiply-accumulating unit is configured to perform multiply-accumulating computations.

In some possible embodiments, the logic control unit is configured to determine, for each weight segment, multiple rows of data in the input feature map based on a convolution stride of the convolutional layer, and read and concatenate the multiple rows of data in sequence to form the input data stream corresponding to said each weight segment.

In some possible embodiment, within said each computation unit PE, the control unit is configured to perform the sliding window operations on the input data stream inputted to said each computation unit PE by taking the cached weight segment as a sliding window and taking a convolution stride of the convolutional layer as a sliding step; and the multiply-accumulating unit is configured to perform the multiply-accumulating computations based on the cached weight segment and data within the sliding window.

In some possible embodiments, in case a cache space of each of the computation units PE is less than an entire row length of the weight matrix, the logic control unit is configured to: split each weight segment of the weight segments into a plurality of sections; cache the plurality of sections of said each weight segment respectively at different time periods in a corresponding computation unit PE; performing, by the computation unit PE, the sliding window operations and the multiply-accumulating computations on the input data stream based on the section presently cached at each of the different time periods to acquire different output feature submaps at the different time periods; and superimpose the acquired output feature submaps.

In some possible embodiment, the logic control unit is configured to determine an index offset value for the sliding window operations based on the section presently cached in each of the computation units PE. The index offset value is configured to indicate an initial position of the sliding window.

The respective embodiments of the present disclosure are described in a progressive manner. The reference may be made to each other for the same or similar parts of the respective embodiments, and each embodiment focuses on the differences from other embodiments. Especially, since the apparatus basically corresponds to the embodiments of the method, it is described in a simple way, and reference may be made to the description part on embodiments of the method for relevant points.

The apparatus according to embodiments of the present disclosure correspond to the method one by one. Thus, the apparatus has similar beneficial technical effects to the corresponding method. Since the beneficial technical effects of the method have been described in detail above, the beneficial technical effects of the apparatus will not be repeated here.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

What is claimed is:

1. A method of accelerating a convolutional neural network, comprising:
   splitting, by rows, a weight matrix of a convolutional layer into a plurality of weight segments, and caching the plurality of weight segments respectively in a plurality of computation units of a computation unit array;
   reading a plurality of input data streams corresponding respectively to the plurality of weight segments, and inputting the plurality of input data streams in parallel to a plurality of rows of the computation units, wherein each of the input data streams is formed by concatenating multiple rows of data from an input feature map of the convolutional layer; and performing, by each of the computation units, sliding window operations and multiply-accumulating computations on the inputted input data stream based on the cached weight segment to acquire an output feature map of the convolutional layer.

2. The method according to claim 1, wherein reading the plurality of input data streams corresponding respectively to the plurality of weight segments further comprises:
determining, for each weight segment of the weight segments, corresponding multiple rows of data in the input feature map based on a convolution stride of the convolutional layer, and reading and concatenating the corresponding multiple rows of data in sequence to form an input data stream corresponding to said each weight segment.

3. The method according to claim 1, wherein performing, by said each of the computation units, the sliding window operations and the multiply-accumulating computations on the inputted input data stream based on the cached weight segment further comprises:
performing, by said each computation unit, the sliding window operations on the corresponding input data stream inputted to said each computation unit by taking the corresponding weight segment as a sliding window and taking a convolution stride of the convolutional layer as a sliding step, and performing the multiply-accumulating computations based on the corresponding weight segment and data within the sliding window.

4. The method according to claim 1, wherein in case a cache space of each of the computation units is less than an entire row length of the weight matrix, the method further comprises:
splitting each weight segment of the weight segments into a plurality of sections; caching the plurality of sections of said each weight segment respectively at different time periods in a corresponding computation unit; performing, by the computation unit, the sliding window operations and the multiply-accumulating computations on the inputted input data stream based on the section presently cached at each of the different time periods to acquire different output feature submaps at the different time periods; and superimposing the acquired output feature submaps.

5. The method according to claim 4, further comprising:
determining an index offset value for the sliding window operations based on the section presently cached in each of the computation units, wherein the index offset value is configured to indicate an initial position of the sliding window.

6. An apparatus for accelerating a convolutional neural network, comprising: a computation platform and an external memory, wherein the computation platform comprises at least a computation unit array for performing convolution computations, an internal memory, and a logic control unit, and the computation unit array comprises a plurality of computation units each comprising a cache unit, a control unit, and a multiply-accumulating unit; wherein
the logic control unit is configured to split, by rows, a weight matrix of a convolutional layer into a plurality of weight segments, cache the plurality of weight segments respectively into the plurality of computation units, read a plurality of input data streams corresponding respectively to the plurality of weight segments, and input the plurality of input data streams in parallel to a plurality of rows of the computation units, wherein each of the input data streams is formed by concatenating multiple rows of data from an input feature map of the convolutional layer; and
within each of the computation units, the cache unit is configured to have a corresponding weight segment of the weight segments cached therein, the control unit is configured to perform sliding window operations on the inputted input data stream based on the corresponding cached weight segment, and the multiply-accumulating unit is configured to perform multiply-accumulating computations.

7. The apparatus according to claim 6, wherein the logic control unit is further configured to:
determine, for each weight segment of the weight segments, corresponding multiple rows of data in the input feature map based on a convolution stride of the convolutional layer, and read and concatenate the corresponding multiple rows of data in sequence to form an input data stream corresponding to said each weight segment.

8. The apparatus according to claim 6, wherein within said each computation unit, the control unit is configured to perform the sliding window operations on the corresponding input data stream inputted to said each computation unit by taking the corresponding cached weight segment as a sliding window and taking a convolution stride of the convolutional layer as a sliding step; and the multiply-accumulating unit is configured to perform the multiply-accumulating computations based on the corresponding cached weight segment and data within the sliding window.

9. The apparatus according to claim 6, wherein in case a cache space of each of the computation units is less than an entire row length of the weight matrix, the logic control unit is configured to:
split each weight segment of the weight segments into a plurality of sections; cache the plurality of sections of said each weight segment respectively at different time periods in a corresponding computation unit of the computation units; performing, by the corresponding computation unit, the sliding window operations and the multiply-accumulating computations on the inputted input data stream based on the section presently cached at each of the different time periods to acquire different output feature submaps at the different time periods; and superimpose the acquired output feature submaps.

10. The apparatus according to claim 9, wherein the logic control unit is further configured to:
determine an index offset value for the sliding window operations based on the section presently cached in the corresponding computation unit, wherein the index offset value is configured to indicate an initial position of the sliding window.

* * * * *